(12) United States Patent
Colonna et al.

(10) Patent No.: US 11,554,740 B1
(45) Date of Patent: Jan. 17, 2023

(54) ANTI-SUBMARINING THIGH AIR BAG WITH TETHERS

(71) Applicant: GM Global Technology Operations LLC, Detroit, MI (US)

(72) Inventors: Nick Colonna, Vaughan (CA); Chin-hsu Lin, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/522,179

(22) Filed: Nov. 9, 2021

(51) Int. Cl.
*B60R 21/207* (2006.01)
*B60R 21/2338* (2011.01)
*B60N 2/427* (2006.01)

(52) U.S. Cl.
CPC ........ *B60R 21/207* (2013.01); *B60N 2/42763* (2013.01); *B60R 21/2338* (2013.01); *B60R 2021/23386* (2013.01)

(58) Field of Classification Search
CPC .............. B60R 21/207; B60R 21/2338; B60R 2021/23386; B60N 2/42763
See application file for complete search history.

(56) References Cited

U.S. PATENT DOCUMENTS

2020/0307492 A1* 10/2020 Iida .................. B60R 21/237
2021/0291773 A1* 9/2021 Thomas ............... B60N 2/4228

FOREIGN PATENT DOCUMENTS

CN 105818778 A * 8/2016 ............... B60N 2/42

* cited by examiner

*Primary Examiner* — Drew J Brown
(74) *Attorney, Agent, or Firm* — Vivacqua Crane PLLC

(57) ABSTRACT

An automobile vehicle airbag system includes a vehicle seat having a seat back rotatably connected to a seat base, with the seat base mounted on a seat frame. A seat base cushion is mounted on the seat frame upon which an occupant is seated. A thigh airbag is connected to the seat frame and positioned above the seat frame and below the seat base cushion in a thigh airbag uninflated condition. At least one airbag tether is connected to the seat frame and to the thigh airbag. A lap belt is connected to the vehicle seat and contacts a pelvis of the occupant. When inflated the thigh airbag pushes upward on the seat base cushion forcing the thighs and pelvis of the occupant upward into frictional contact with the lap belt, thereby mitigating against submarining of the pelvis beneath the lap belt.

15 Claims, 4 Drawing Sheets

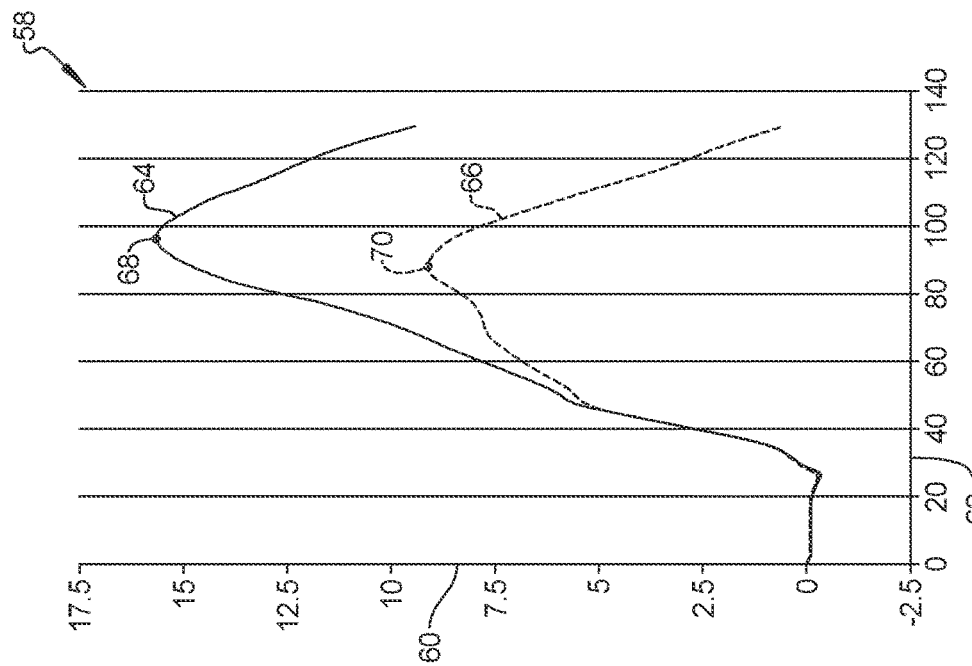
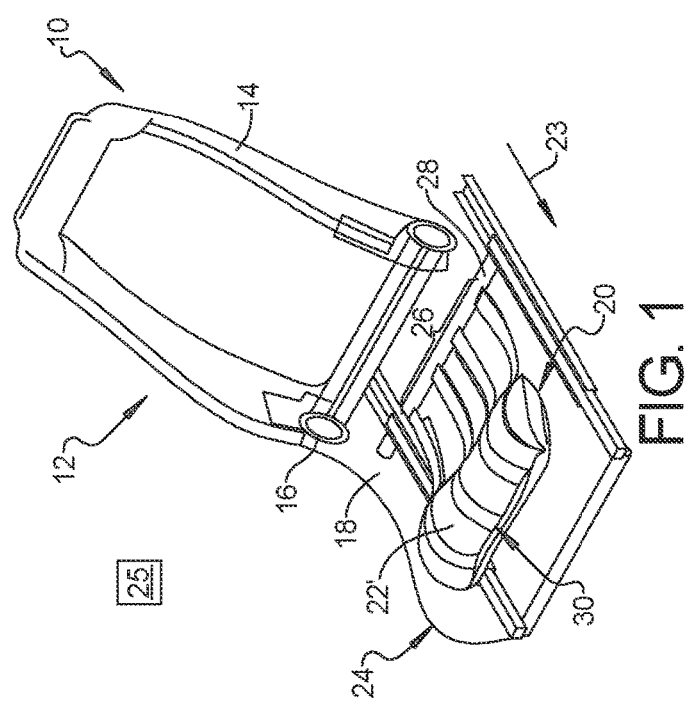
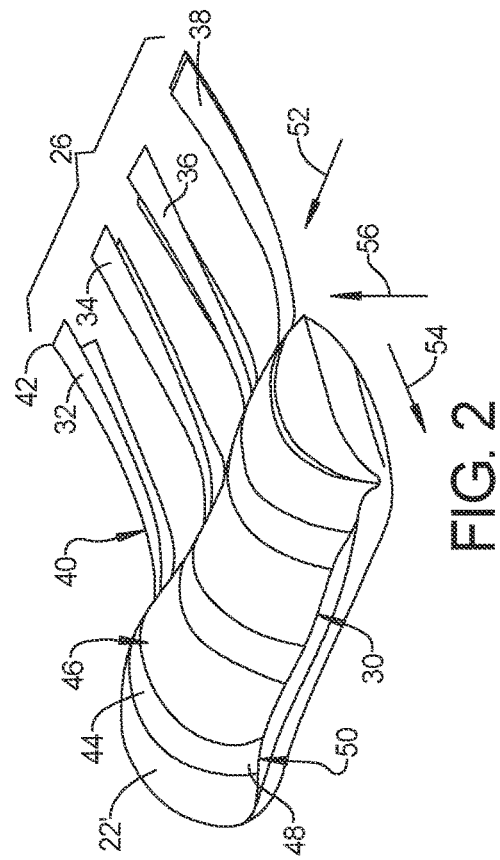

ANTI-SUBMARINING THIGH AIR BAG WITH TETHERS

INTRODUCTION

The present disclosure relates to automobile vehicle seat airbag systems.

In known automobile vehicle seat designs having a 3-point harness seat belt design, an occupant in a reclined (~45 degree) position or an upright position may have "submarining" or sliding beneath the seat belt such as a lap belt during an emergency operation using existing or known 3-point harness designs.

Existing alternate systems include anti-submarining bars or brackets which limit occupant submarining motion. Such bars or brackets, however, may impair occupant comfort. Other known alternate systems include adding an under thigh airbag on a seat base upper surface, which when inflated decreases a gap between the lap belt and the seat base upper surface and increases the seat cushion angle, thereby limiting space for submarining to occur. Such thigh airbags however may rock or roll forward under friction from an occupant being accelerated forward and thereby increase the gap between the lap belt and the seat base upper surface and may reduce an under thigh airbag effectiveness.

Thus, while current vehicle seat restraint and airbag systems achieve their intended purpose, there is a need for a new and improved vehicle seat under thigh airbag system.

SUMMARY

According to several aspects, an automobile vehicle airbag system includes a vehicle seat having a seat base mounted on a seat frame. A seat base cushion is mounted on the seat frame upon which an occupant is seated. A thigh airbag is connected to the seat frame and is positioned above the seat frame and below the seat base cushion in a thigh airbag uninflated condition. At least one airbag tether is connected to the seat frame and to the thigh airbag. During inflation of the thigh airbag, the at least one airbag tether restricts a forward movement of the thigh airbag allowing the thigh airbag in an inflated condition to raise the seat base cushion and thereby raise a pelvis of the occupant.

In another aspect of the present disclosure, the seat frame includes a frame cross rod oriented in a cross-car orientation.

In another aspect of the present disclosure, a first end of the at least one airbag tether is connected to the frame cross rod and a second end of the at least one airbag tether is connected to the thigh airbag.

In another aspect of the present disclosure, the thigh airbag is positioned above the seat frame and above multiple seat support members defining at least multiple seat springs.

In another aspect of the present disclosure, a lap belt is connected to the vehicle seat and contacts the pelvis of the occupant. When inflated, the thigh airbag pushing upward on the seat base cushion forces the pelvis of the occupant upward into frictional contact with the lap belt, thereby mitigating against submarining of the pelvis beneath the lap belt.

In another aspect of the present disclosure, the at least one airbag tether includes four tethers individually including a rear connection point adapted to fix the at least one airbag tether to the frame cross rod.

In another aspect of the present disclosure, the at least one airbag tether overlaps onto an upper surface of the thigh airbag and is fixed to a forward directed face of the thigh airbag.

In another aspect of the present disclosure, the at least one airbag tether includes a low-point midsection positioned between a rear connection point of the at least one airbag tether adapted for fixing the at least one airbag tether to the frame cross rod, and an upper surface overlapping portion which directly contacts an upward facing surface of the thigh airbag in the inflated condition.

In another aspect of the present disclosure, a tether tensioning device applies a tensioning force at high velocity in a rearward direction opposite to a forward directed component of displacement of the thigh airbag during inflation.

In another aspect of the present disclosure, as the thigh airbag inflates the tether tensioning device simultaneously actuates to add a tensioning force to the airbag tethers, thereby more quickly pulling the airbag tethers upward against the seat base cushion and increasing cushion support.

According to several aspects, an automobile vehicle airbag system includes a vehicle seat having a seat back rotatably connected to a seat base, with the seat base mounted on a seat frame. A seat base cushion is mounted on the seat frame upon which an occupant is seated. A thigh airbag is connected to the seat frame and is positioned above the seat frame and below the seat base cushion in a thigh airbag uninflated condition. At least one airbag tether is connected to the seat frame and to the thigh airbag. A lap belt is connected to the vehicle seat and contacts a pelvis of the occupant. When inflated the thigh airbag helps support the seat base cushion preventing downward excursion of the pelvis of the occupant and allowing for frictional contact of the occupant with the lap belt, thereby mitigating against submarining of the pelvis beneath the lap belt.

In another aspect of the present disclosure, during inflation of the thigh airbag the at least one airbag tether restricts a forward movement of the thigh airbag.

In another aspect of the present disclosure, the pelvis of the occupant is positioned rearward of the thigh airbag and a lower surface of thighs of the occupant directly contact and are supported by the seat base cushion.

In another aspect of the present disclosure, the at least one tether defines multiple airbag tethers individually fixed to a rear facing surface of the thigh airbag.

In another aspect of the present disclosure, the at least one airbag tether is connected to the thigh airbag using a sewn seam.

In another aspect of the present disclosure, the at least one airbag tether includes an upper surface overlapping portion overlapping an upper surface of the thigh airbag, and a sewn seam fixed to a forward directed face of the thigh airbag.

In another aspect of the present disclosure, as the thigh airbag inflates the upper surface overlapping portion is pulled both upward and forward in an airbag displacement direction. The airbag displacement direction includes a forward directed component of displacement and an upward directed component of displacement. The upward directed component of displacement upwardly displaces a low-point midsection of the at least one airbag tether as the thigh airbag inflates, pulling the at least one airbag tether forward, straightening the at least one airbag tether and stopping the thigh airbag when inflated from rolling forward.

According to several aspects, a method for mitigating against submarining motion of an occupant of an automobile vehicle seat includes: mounting a seat base cushion on a seat frame upon which an occupant is seated; connecting a thigh airbag to the seat frame and positioning the thigh airbag above the seat frame and below the seat base cushion in a thigh airbag uninflated condition; fixing at least one airbag tether to the seat frame and to the thigh airbag to restrict forward displacement of the thigh airbag; connecting a lap belt to the vehicle seat in contact with a pelvis of the occupant; and inflating the thigh airbag to push upward on the seat base cushion and thereby forcing the thighs of the occupant upward into frictional contact with the lap belt to mitigate against submarining of the pelvis beneath the lap belt.

In another aspect of the present disclosure, the method further includes creating a low-point midsection positioned between a rear connection point of the at least one airbag tether to the seat frame and an upper surface overlapping portion of the at least one airbag tether which directly contacts an upward facing surface of the thigh airbag in the inflated condition.

In another aspect of the present disclosure, the method further includes applying a tether tensioning force to the at least one airbag tether from a tether tensioning device in a rearward direction acting opposite to a forward directed component of displacement of the thigh airbag during inflation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a front left perspective view looking rearward of an automobile vehicle seat having an automobile vehicle seat thigh airbag system according to an exemplary aspect;

FIG. 2 is a front left perspective view of the thigh airbag and airbag tethers of FIG. 1;

FIG. 3 is a graph presenting occupant pelvis rotation over time for the system of FIG. 1;

DETAILED DESCRIPTION

Figure 5:
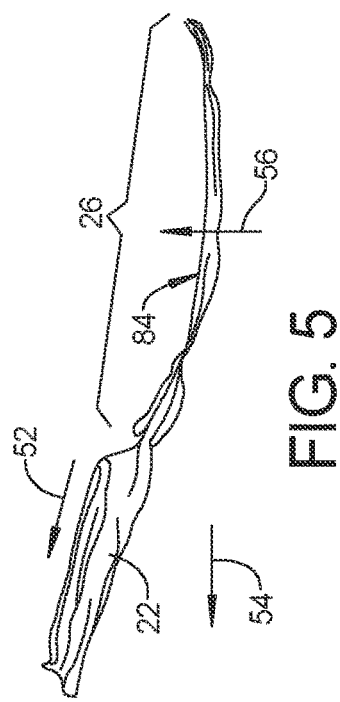
FIG. 5 is a side elevational view of an uninflated thigh airbag and tether assembly for the system of FIG. 1.

The following description is merely exemplary in nature and is not intended to limit the present disclosure, application, or uses.

Referring to FIG. 1, an automobile vehicle seat thigh airbag system 10 is provided for an automobile vehicle seat 12 having a seat back 14 which is rotated between multiple upright positions for normal travel with respect to a hinge 16 and may be rotated rearwardly to an occupant reclining position shown, which may range from an upright position to greater than 45 degrees from a vertical orientation and may be for example oriented approximately 45 degrees rearward for the occupant reclining position. The seat back 14 is rotatably connected to a seat base 18, which is mounted on a seat frame 20. The seat base 18 may be adjusted both forward or backward by the occupant for comfort. According to several aspects, an inflatable cushion or thigh airbag 22', designated by an apostrophe to identify an inflated condition of the airbag, is mounted on the seat frame 20 and positioned above the seat frame 20 including seat support members such as seat springs and below a seat base cushion 24 upon which an occupant is seated.

Figure 4:
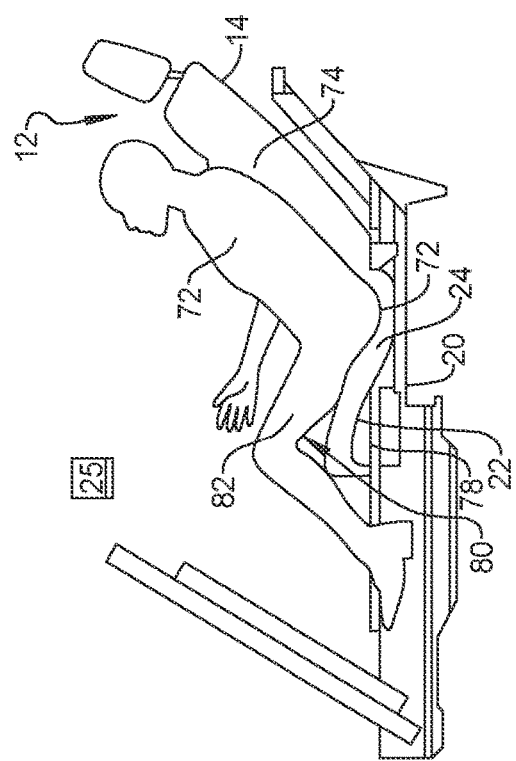
FIG. 4 is a left side elevational view of an occupant seated in the automobile vehicle seat of FIG. 1 with the thigh airbag in an uninflated condition.
Figure 6:
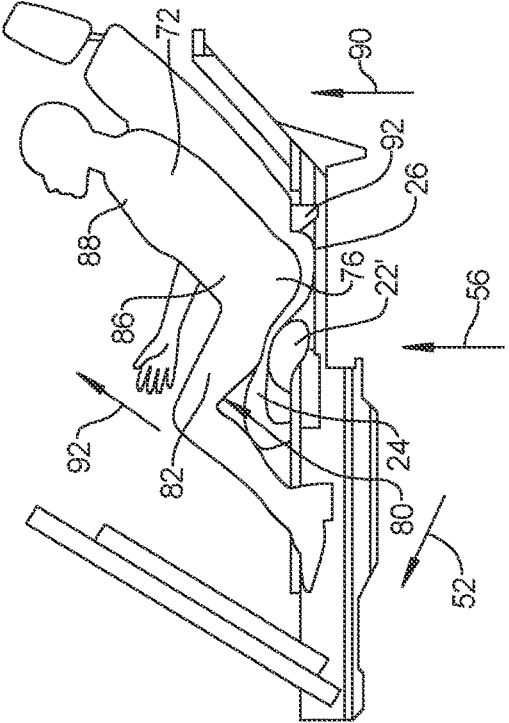
FIG. 6 is a left side elevational view of an occupant seated in the automobile vehicle seat modified from FIG. 4 having the thigh airbag in an inflated condition.

The occupant, shown with respect to FIG. 4, normally accelerates from a seated position on the seat base cushion 24 in a forward direction 23. This forward acceleration of the occupant is resisted by contact of the pelvis of the occupant with a seat lap belt 86 shown and described in reference to FIG. 6. Contact with the seat lap belt may cause rotation of the occupant's pelvis which may manifest in a portion of the rotation acceleration acting below the seat lap belt, resulting in the pelvis and legs of the occupant "submarining" or sliding beneath the lap belt, shown in reference to FIG. 6, which is part of a normally provided 3-point harness system with the automobile vehicle seat 12. To restrict this forward and downward sliding motion and mitigate against submarining, the thigh airbag 22' inflates from a signal received from a sensor 25 which may also provide actuation signals for other vehicle airbags (not shown) including dashboard, side curtain and steering wheel airbags. When inflated, the thigh airbag 22' pushes upward on the seat base cushion 24 which forces the thighs and pelvis of the occupant upward into frictional contact with the lap belt, thereby mitigating against submarining of the occupants' pelvis beneath the lap belt to occur.

To further enhance resistance to submarining, the thigh airbag 22' is provided with at least one and according to several aspects approximately four airbag tethers 26. The airbag tethers 26 are fixed for example by a tether loop or a mechanical connector at a first end of the airbag tethers 26 to a frame cross rod 28 of the seat frame 20 which is oriented in a cross-car orientation, and at a second end of the airbag tethers 26 to an airbag surface 30. The thigh airbag 22' is normally deflated as shown in reference to FIG. 5 and is supported on the seat frame 20 above seat cushion support members 78 including seat springs shown and described in reference to FIG. 4, beneath and in contact with an underside of the thigh airbag 22'.

Referring to FIG. 2 and again to FIG. 1, the inflated thigh airbag 22' is shown in a fully inflated condition for clarity. According to several aspects, the airbag tethers 26 may define four individual airbag tethers which are identical to each other, and include a first tether 32, a second tether 34, a third tether 36 and a fourth tether 38. Individual ones of the airbag tethers 26 include a low-point midsection 40 between a rear connection point 42 adapted for fixing the connection point to the frame cross rod 28, and an upper surface overlapping portion 44 which directly contacts an upward facing surface 46 of the thigh airbag 22' in the inflated condition. The low-point midsection 40 appears as a downward curving portion of the airbag tethers 26 in the thigh airbag 22' fully inflated condition shown. According to several aspects, a forward connection point 48 of the airbag tethers 26 may be fixed such as by a sewn seam to a forward directed face 50 of the airbag surface 30.

According to several aspects, as the thigh airbag 22' inflates the upper surface overlapping portion 44 is pulled both upward and forward in an airbag displacement direction 52. The airbag displacement direction 52 includes both a forward directed component 54 of displacement and an upward directed component 56 of displacement. The airbag displacement direction 52 therefore in part results in an upward directed component of displacement of the low-point midsection 40 of the airbag tethers 26. As the thigh airbag 22' inflates it pulls the airbag tethers 26 forward, straightening the airbag tethers 26, and stopping the inflated thigh airbag 22' from rolling forward. This combination helps reduce pelvis rotation, supports the pelvis vertically and minimizes a forward excursion of the occupant during a crash event.

Referring to FIG. 3 and again to FIGS. 1 and 2, a graph 58 presents comparative occupant pelvis angular rotation values 60 compared to a time 62 in milliseconds (ms). For automobile vehicles having the airbag tethers 26 of the present disclosure and for automobile vehicles not having the airbag tethers 26. A first curve 64 presents occupant pelvis rotation values during a rapid deceleration event of an automobile vehicle not having the airbag tethers 26. A second curve 66 presents occupant pelvis rotation values during a rapid deceleration event of an automobile vehicle which includes the airbag tethers 26. A first pelvis rotation peak value 68 of approximately 16 degrees occurs at a time of approximately 95 ms after initiation of the deceleration event beginning at zero ms. A second pelvis rotation peak value of approximately 9 degrees occurs at a time of approximately 90 ms after initiation of the deceleration event. From this exemplary data, the airbag tethers 26 of the present disclosure are effective to reduce an overall maximum pelvic rotation peak, and also provide the maximum reduced maximum pelvic rotation peak sooner than the system not having the airbag tethers 26.

Referring to FIG. 4 and again to FIGS. 1 and 2, an occupant 72 is shown seated in a reclined position of the seat back 14 of the automobile vehicle seat 12. The occupant 72 directly contacts a seat back cushion 74 and the seat base cushion 24. In the reclined position a lower pelvis 76 of the occupant 72 contacts and downwardly deflects the seat base cushion 24. The thigh airbag 22 is in a non-inflated condition and is supported on seat base support components 78 including seat springs, and seat spring support structure which are connected to a moveable portion of the seat frame 20. A lower surface 80 of the thighs 82 of the occupant 72 directly contact and are supported by the seat base cushion 24.

Referring to FIG. 5 and again to FIG. 4, the thigh airbag 22 in an uninflated condition does not apply a force on the airbag tethers 26 in the airbag displacement direction 52. Therefore, when the thigh airbag 22 is in the uninflated condition a concave surface 84 of the airbag tethers 26 may directly contact a lower surface of the seat base cushion 24, however the airbag tethers 26 do not apply a force against the seat base cushion in the upward directed component 56 of displacement.

Referring to FIG. 6 and again to FIGS. 4 through 5, the occupant 72 is normally retained in the seatback resting position by the use of 3-point harness assembly having a lap belt 86 positioned at the hips of the occupant 72, and a shoulder strap 88 acting against the upper torso of the occupant 72. As the thigh airbag 22' inflates to achieve the inflated condition shown, the thigh airbag 22' pulls the airbag tethers 26 in the airbag displacement direction 52, from which the upward directed component 56 of displacement acts on the airbag tethers to pull the airbag tethers 26 upward. An upward directed force 90 from the upward directed component 56 of displacement of the airbag tethers 26 pushes the seat base cushion 24 upward, and also rotates the thighs 82 and the pelvis 76 about an arc of rotation 92, resulting in the thighs 82 of the occupant 72 displacing upward, and with a small component of vertical displacement of the pelvis 76. The position of the inflated thigh airbag 22' being forward of the lower pelvis 76 of the occupant 72 and the upward displacement of the seat base cushion 24 together minimize an available space for the lower pelvis 76 to submarine below the lap belt 86.

According to further aspects, any of the automobile vehicle seat thigh airbag systems of the present disclosure may further include a tether tensioning device 94. The tether tensioning device 94 may define mechanical means such as a motor or a pyrotechnic device capable of applying a tensioning force at high velocity in a rearward direction opposite to the forward directed component 54 of displacement described in reference to FIG. 2. As the thigh airbag 22' inflates the tether tensioning device 94 simultaneously actuates to add additional tensioning force to the airbag tethers 26, thereby more quickly pulling the airbag tethers 26 upward against the seat base cushion 24. According to several aspects, the tether tensioning device 94 may be actuated using the same signal from the sensor 25 used to actuate the thigh airbag 22.

Figure 7:
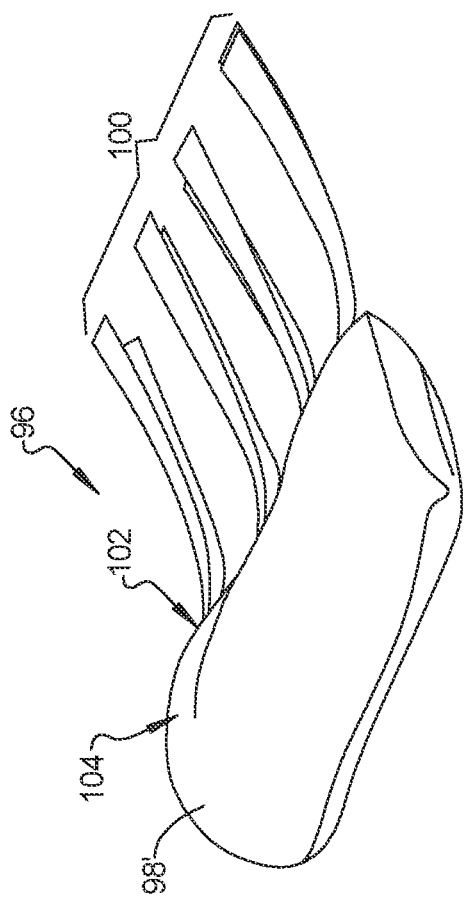
FIG. 7 is a front left perspective view of a thigh airbag and airbag tether of another aspect of the present disclosure with the thigh airbag in an inflated condition.

Referring to FIG. 7 and again to FIGS. 1, 2 and 5, according to further aspects an automobile vehicle seat thigh airbag system 96 is modified from the automobile vehicle seat thigh airbag system 10 as follows. The automobile vehicle seat thigh airbag system 96 includes a thigh airbag 98', again using an apostrophe to indicate the airbag in an inflated condition. At least one and according to several aspects multiple airbag tethers 100, which are similar to the single or multiple airbag tethers 26, are individually fixed to a rear facing surface 102 of the thigh airbag 98', and therefore do not contact or overlap an upper surface 104 of the thigh airbag 98'. The thigh airbag 98' is positioned the same as the thigh airbag 22', and otherwise functions similarly to the thigh airbag 22' when inflated to pull the airbag tethers 100 upward as described in reference to FIGS. 1 through 6.

Figure 8:
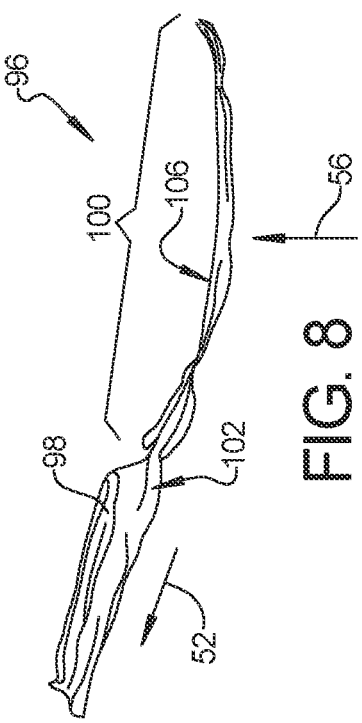
FIG. 8 is a side elevational view of the thigh airbag and airbag tether of FIG. 7 in an airbag uninflated condition.

Referring to FIG. 8 and again to FIGS. 1, 2, 5 and 7, the thigh airbag 98 is shown in a uninflated condition, which provides for a downward curving shape of the airbag tethers 100, thereby providing a concave surface 106 of the airbag tethers 100, similar to the concave surface 84 of the airbag tethers 26 when the thigh airbag 22 is in the uninflated condition. As the thigh airbag 98 inflates to achieve the inflated condition shown in FIG. 7, the thigh airbag 98 pulls the airbag tethers 100 in the airbag displacement direction 52, from which the upward directed component 56 of displacement acts on the airbag tethers 100 to pull the airbag tethers 100 upward. A total tensioning force acting against the airbag tethers 100 may be less than a total tensioning force acting on the airbag tethers 26 because the airbag tethers 26 also receive additional rotational displacement force due to their attachment at the forward directed face 50 of the airbag surface 30, such that inflation of the thigh airbag 22' applies additional rotational force and therefore increases a tensioning force acting on the airbag tethers 26 compared to the airbag tethers 100.

Figure 9:
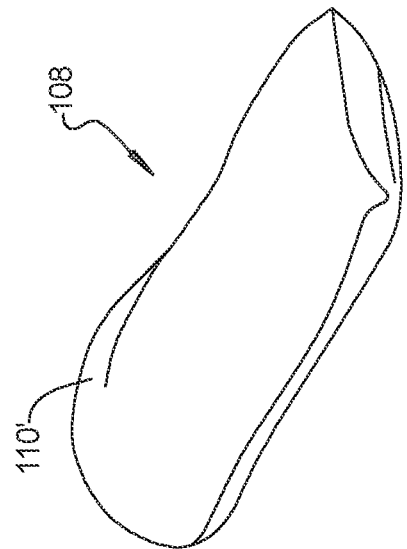
FIG. 9 is a front left perspective view of a thigh airbag lacking an airbag tether of another aspect of the present disclosure with the thigh airbag in an inflated condition.

Referring to FIG. 9 and again to FIGS. 1 through 8, according to further aspects an automobile vehicle seat thigh airbag system 108 is modified from the automobile vehicle seat thigh airbag system 10 and the automobile vehicle seat thigh airbag system 96 as follows. The automobile vehicle seat thigh airbag system 108 includes a thigh airbag 110', again using an apostrophe to indicate the airbag in an inflated condition. The thigh airbag 110' does not include airbag tethers, but is positioned to maximize the upward directed component 56 of displacement of the seat base cushion 24 (not shown in this view).

Figure 10:
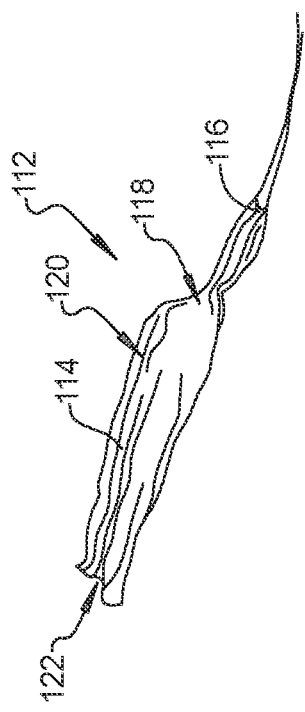
FIG. 10 is a side elevational view of the thigh airbag of FIG. 9 in an airbag uninflated condition.

Referring to FIG. 10 and again to FIGS. 1 through 9, according to further aspects an automobile vehicle seat thigh airbag system 112 is modified from the automobile vehicle seat thigh airbag system 10, the automobile vehicle seat thigh airbag system 96, and the automobile vehicle seat thigh airbag system 108. The automobile vehicle seat thigh airbag system 112 includes a thigh airbag 114 shown in an uninflated condition, which includes a single airbag tether 116. The single airbag tether 116 has a width extending substantially across a width of the thigh airbag 114 and is attached at a rear surface 118 of the thigh airbag 114. According to further aspects in lieu of being connected at the rear surface 118, the single airbag tether 116 may also overlap an upper surface 120 of the thigh airbag 114 and be fixedly connected along a front surface 122 of the thigh airbag 114, similar to the connection means of the airbag tethers 26 described in reference to FIG. 2, and therefore function similar to the airbag tethers 26.

Figure 11:
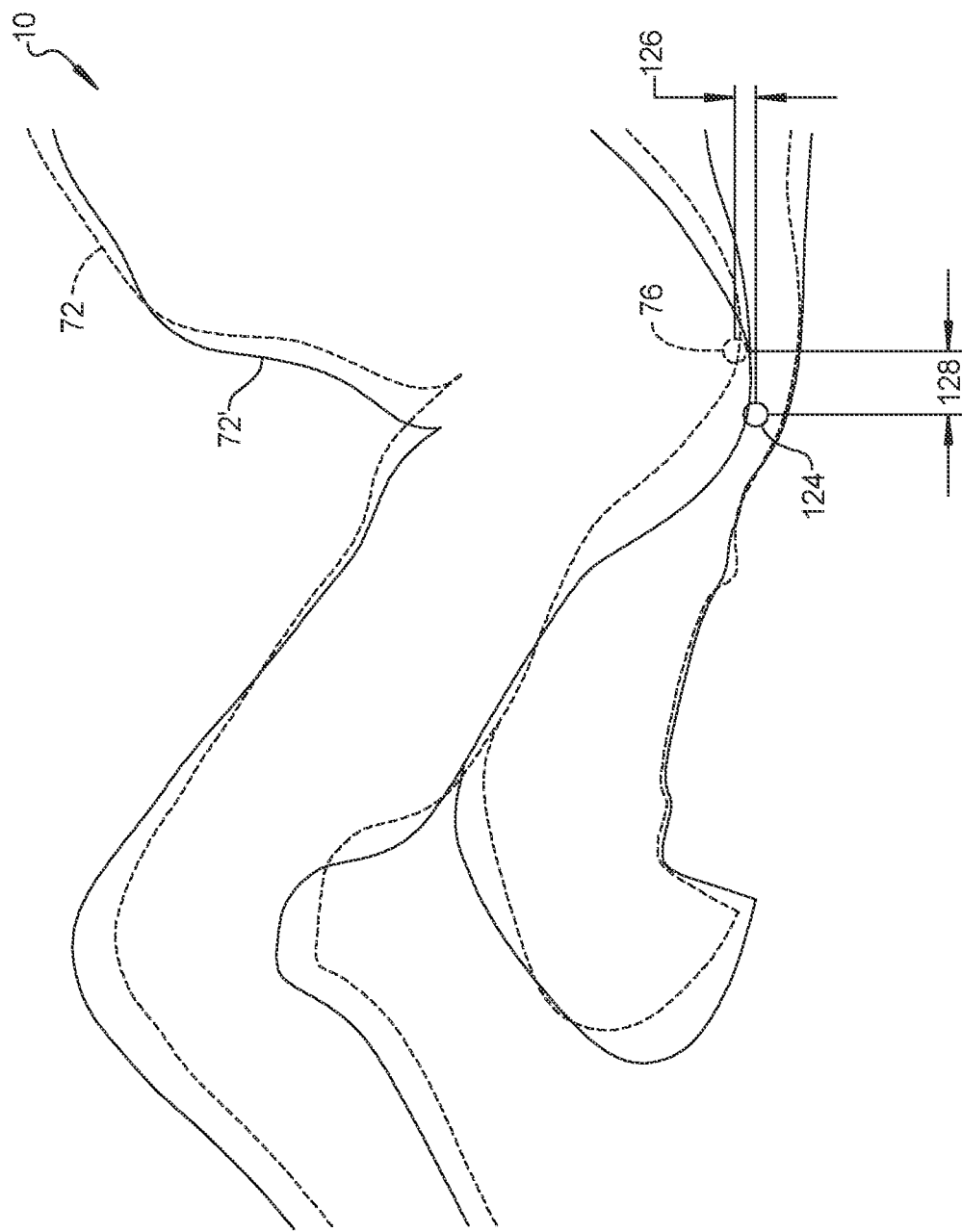
FIG. 11 is a side elevational partial cross sectional view comparing an occupant in a vehicle seat having the automobile vehicle seat thigh airbag system and a vehicle seat lacking the automobile vehicle seat thigh airbag system of the present disclosure.

Referring to FIG. 11 and again to FIGS. 4 through 5, automobile vehicle seat thigh airbag systems of the present disclosure, similar to the automobile vehicle seat thigh airbag system 10, allow occupant displacements that mitigate against submarining effects. In the reclined position the lower pelvis 76 of the occupant 72 applying the automobile vehicle seat thigh airbag systems of the present disclosure is forced to elevate to an elevation difference 126 above a position of the lower pelvis 124 of the occupant 72' when an automobile vehicle seat thigh airbag system of the present disclosure is not employed. The elevation difference 126 helps mitigate against occupant submarining below the lap belt 86 described in reference to FIG. 6.

In addition, in the reclined position the lower pelvis 76 of the occupant 72 applying the automobile vehicle seat thigh airbag systems of the present disclosure is retained closer to an initial position of the pelvis prior to a deceleration event. A forward displacement difference 128 occurs between a position of the lower pelvis 76 of the occupant 72 when an automobile vehicle seat thigh airbag system of the present disclosure is employed compared to a position of the lower pelvis 124 of the occupant 72' when an automobile vehicle seat thigh airbag system of the present disclosure is not employed. The forward displacement difference 128 when an automobile vehicle seat thigh airbag system of the present disclosure is not employed may contribute to submarining of the occupant 72'.

An automobile vehicle seat thigh airbag system of the present disclosure offers several advantages. These include utilizes a force of a thigh airbag as it inflates to remove slack and pull forwards external tethers that are fixed to a seat frame, thus restraining the thigh airbag from rolling forwards. This results in minimizing the occupant's pelvis from rotating excessively, while supporting it vertically and reducing occupant and thigh airbag forward movement during a vehicle frontal impact. The automobile vehicle seat thigh airbag system of the present disclosure is not dependent on a seat track angle to be effective and may be used at a zero track angle. The system of the present disclosure provides improved comfort compared to other traditional anti-submarining methods such as anti-submarining brackets or bars. External airbag tethers are fixed to a seat frame that straighten in a fore/aft direction when the thigh airbag is deployed, preventing the thigh airbag from rolling forwards while supporting the pelvis of the occupant vertically.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle airbag system, comprising:
   a vehicle seat having a seat base mounted on a seat frame;
   a seat base cushion mounted on the seat frame upon which an occupant is seated;
   a thigh airbag connected to the seat frame and positioned above the seat frame and below the seat base cushion in a thigh airbag uninflated condition; and
   at least one airbag tether connected to the seat frame and to the thigh airbag,
   wherein during inflation of the thigh airbag, the at least one airbag tether restricts a forward movement of the thigh airbag allowing the thigh airbag in an inflated condition to raise the seat base cushion and thereby raise thighs and a pelvis of the occupant, and
   wherein the seat frame includes a frame cross rod oriented in a cross-car orientation and a first end of the at least one airbag tether is connected to the frame cross rod and a second end of the at least one airbag tether is connected to the thigh airbag.

2. The system of claim 1, wherein the thigh airbag is positioned above the seat frame and above multiple seat support members defining at least multiple seat springs.

3. The system of claim 1, further including a lap belt connected to the vehicle seat and contacting the pelvis of the occupant, wherein when inflated, the thigh airbag pushing upward on the seat base cushion forces the pelvis of the occupant upward into frictional contact with the lap belt, thereby mitigating against submarining of the pelvis beneath the lap belt.

4. The system of claim 1, wherein the at least one airbag tether includes four tethers individually including a rear connection point adapted to fix the at least one airbag tether to the frame cross rod.

5. The system of claim 1, wherein the at least one airbag tether overlaps onto an upper surface of the thigh airbag and is fixed to a forward directed face of the thigh airbag.

6. The system of claim 1, wherein the at least one airbag tether includes a low-point midsection positioned between a rear connection point of the at least one airbag tether adapted for fixing the at least one airbag tether to the frame cross rod, and an upper surface overlapping portion which directly contacts an upward facing surface of the thigh airbag in the inflated condition.

7. The system of claim 1, further including a tether tensioning device applying a tensioning force in a rearward direction opposite to a forward directed component of displacement of the thigh airbag during thigh airbag inflation.

8. The system of claim 7, wherein as the thigh airbag inflates the tether tensioning device simultaneously actuates to add a tensioning force to the at least one airbag tether, thereby more quickly pulling the at least one airbag tether upward against the seat base cushion.

9. An automobile vehicle airbag system, comprising:
a vehicle seat having a seat back rotatably connected to a seat base, with the seat base mounted on a seat frame, the seat frame having a frame cross rod oriented in a cross-car orientation;
a seat base cushion mounted on the seat frame upon which an occupant is seated;
a thigh airbag connected to the seat frame and positioned above the seat frame and below the seat base cushion in a thigh airbag uninflated condition;
at least one airbag tether connected to the seat frame and to the thigh airbag; and
a lap belt connected to the vehicle seat and contacting a pelvis of the occupant, wherein when inflated the thigh airbag pushes upward on the seat base cushion forcing the pelvis of the occupant upward into frictional contact with the lap belt, thereby mitigating against submarining of the pelvis beneath the lap belt,
wherein the at least one airbag tether includes four tethers individually including a rear connection point adapted to fix the at least one airbag tether to the frame cross rod.

10. The system of claim 9, wherein during inflation of the thigh airbag the at least one airbag tether restricts a forward movement of the thigh airbag.

11. The system of claim 9, wherein the pelvis of the occupant is positioned rearward of the thigh airbag and a lower surface of thighs of the occupant are in direct contact with and are supported by the seat base cushion.

12. The system of claim 9, wherein the at least one airbag tether is connected to the thigh airbag using a sewn seam.

13. The system of claim 9, wherein the at least one airbag tether includes an upper surface overlapping portion overlapping an upper surface of the thigh airbag, and a sewn seam fixed to a forward directed face of the thigh airbag.

14. The system of claim 13, wherein as the thigh airbag inflates the upper surface overlapping portion is pulled both upward and forward in an airbag displacement direction, the airbag displacement direction including a forward directed component of displacement and an upward directed component of displacement; and
wherein the upward directed component of displacement upwardly displaces a low-point midsection of the at least one airbag tether as the thigh airbag inflates, pulling the at least one airbag tether forward, straightening the at least one airbag tether and stopping the thigh airbag when inflated from rolling forward.

15. An automobile vehicle airbag system, comprising:
a vehicle seat having a seat base mounted on a seat frame;
a seat base cushion mounted on the seat frame upon which an occupant is seated;
a thigh airbag connected to the seat frame and positioned above the seat frame and below the seat base cushion in a thigh airbag uninflated condition;
at least one airbag tether connected to the seat frame and to the thigh airbag; and
a tether tensioning device applying a tensioning force in a rearward direction opposite to a forward directed component of displacement of the thigh airbag during thigh airbag inflation,
wherein during inflation of the thigh airbag, the at least one airbag tether restricts a forward movement of the thigh airbag allowing the thigh airbag in an inflated condition to raise the seat base cushion and thereby raise thighs and a pelvis of the occupant.

* * * * *